United States Patent
Bancroft

[11] 3,922,118
[45] Nov. 25, 1975

[54] ROTARY VANE PISTON DEVICES WITH STATIONARY SPUR GEARS AND CRANKSHAFT HUB BEARINGS

[76] Inventor: Charles Bancroft, P.O. Box 14, Wakefield, N.H. 03888

[22] Filed: Nov. 28, 1973

[21] Appl. No.: 419,879

[52] U.S. Cl. .............................. 418/37; 123/8.47
[51] Int. Cl.² .......... F01C 1/00; F04C 17/00; F02B 55/14
[58] Field of Search .................... 418/35–38; 123/8.47

[56] References Cited
UNITED STATES PATENTS

| | | | |
|---|---|---|---|
| 1,370,548 | 3/1921 | Neebe | 123/8.47 |
| 2,544,480 | 3/1951 | Bancroft | 418/37 |
| 3,658,447 | 4/1972 | Bancroft | 418/37 |

Primary Examiner—John J. Vrablik
Attorney, Agent, or Firm—Mattern, Ware & Davis

[57] ABSTRACT

Rotary vane piston gas generators, engines or compressors employing rotating sets of vane pistons, with each set accelerating and decelerating as it moves around an annular chamber, achieve unexpectedly efficient, low-friction operation by virtue of several unique structural features. Dynamic friction is significantly reduced by a drive mechanism connecting the piston sets to a crankshaft and employing planetary captive connecting members rotatably mounted on crankthrows and incorporating ring gears engaging fixed, stationary spur gears anchored to the casing of the device. Dynamic loads are substantially reduced, minimizing dynamic friction between lubricated bearing surfaces and engaging gear teeth. A central hub portion of the crankshaft between oppositely offset crankpins is stabilized by its rotating engagement in a surrounding sleeve bearing formed in the support member of one of the rotating vane piston sets, minimizing crankshaft distortion and bending during operation. This support member additionally provides rotational bearing support for the support members of the other rotating piston sets, thereby reducing distortion of these rotating support members. Interfitting sector-shaped cutouts in flange portions of these piston support members facilitate their connection to the planetary connecting members by sturdy pivoting pins mounted in crosshead bearing blocks slidingly engaged in the connecting members, which are themselves rotatably mounted on the crankpins of the crankshaft.

9 Claims, 13 Drawing Figures

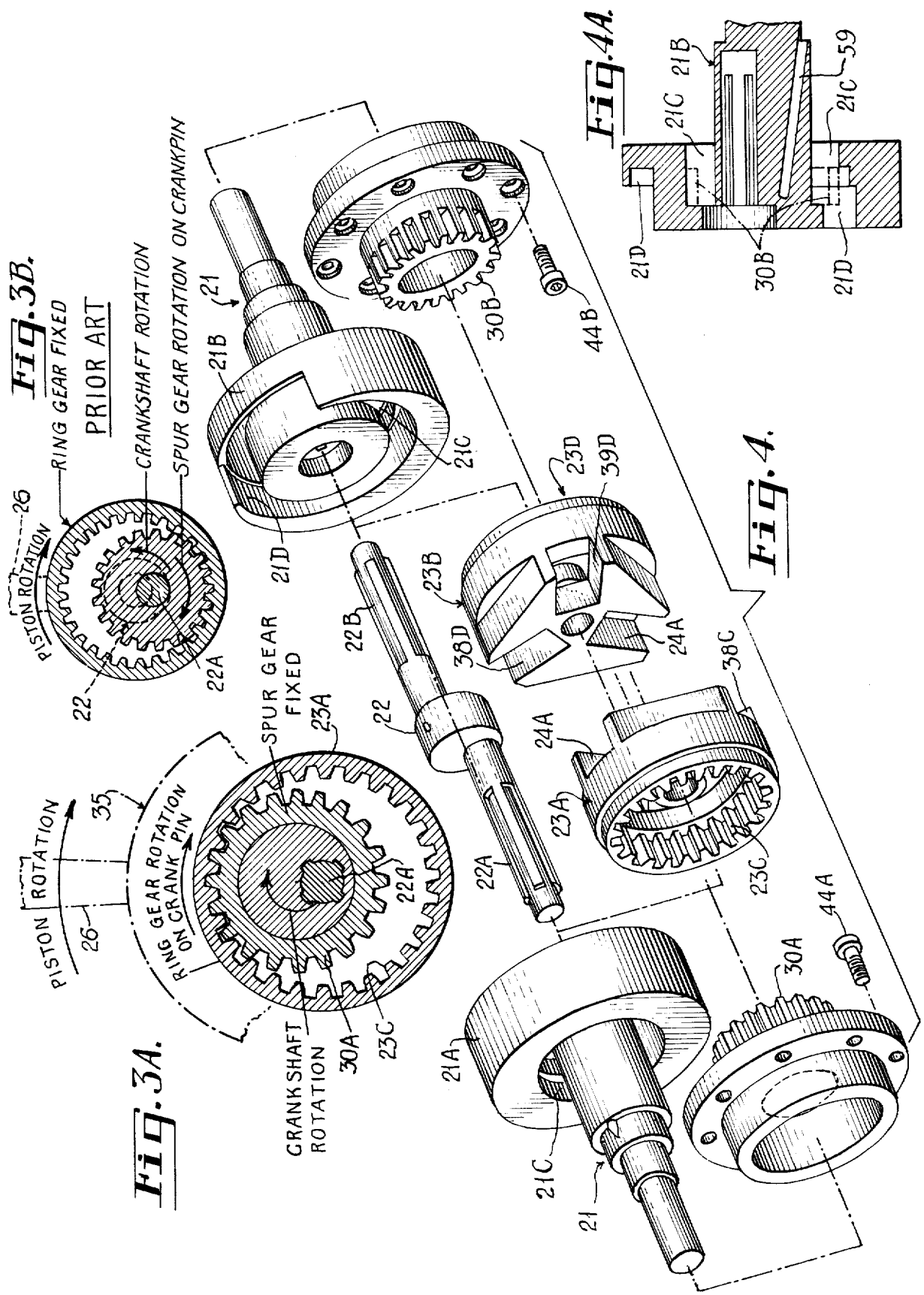

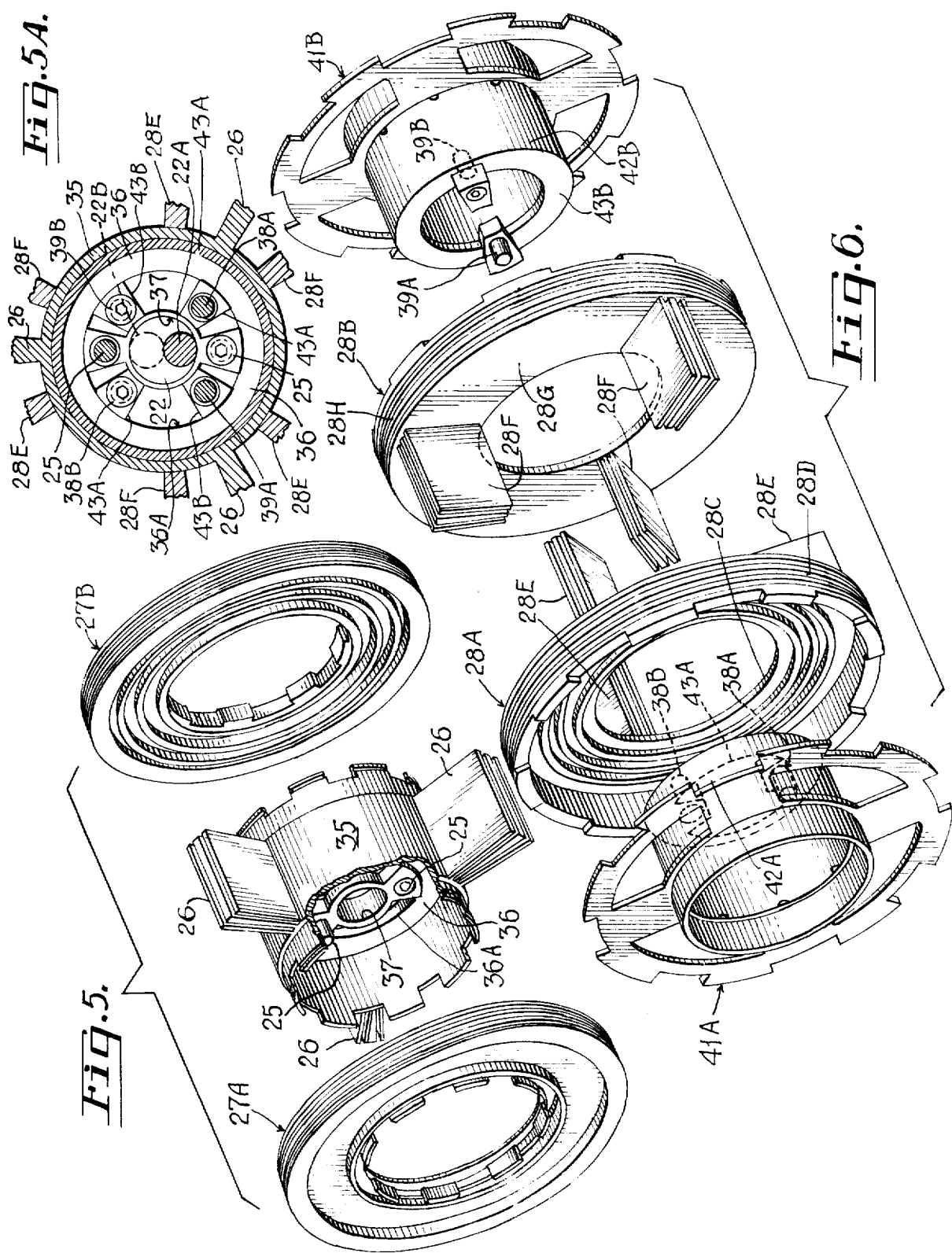

ROTARY VANE PISTON DEVICES WITH STATIONARY SPUR GEARS AND CRANKSHAFT HUB BEARINGS

This invention relates to rotary vane piston engines having sets of vane pistons alternately accelerating and decelerating as they move around an annular piston chamber. More particularly, the engines and compressors or gas generators of this invention incorporate drive mechanisms employing planetary connecting members rotatably mounted on the oppositely offset crankthrows of a central crankshaft and connected to support members for each of the vane piston sets by diametrically opposed pivoting pins mounted in crosshead bearings slidingly engaged in the connecting members.

BRIEF SUMMARY OF THE INVENTION

This rotary compression engine or gas generator has no trochoid or other irregularly curved surfaces to complicate mass production and, including the four parts comprising the casing, there are only thirteen differently shaped parts, other than sealing rings, bearings and the like.

In a single ring-shaped working chamber, without multiple units, it provides regularly spaced, overlapping working strokes. It can combine in one unit, without the addition of any extra parts, a four stroke engine having high volumetric efficiency and complete scavenging, a compressor for emission control, and oil pumps for internal cooling and lubrication.

In the first embodiment shown in the drawings, torsional reciprocation of the vane piston sets involves a maximum deviation of only 17.4° from the rotational norm occurring once every 160° of crankshaft rotation, and all inertia forces resulting are balanced out before they reach the crankshaft or gears so that, in operation, a properly balanced engine gives the illusion of pure rotary motion.

Although performance is stated in terms of crankshaft rotation, all other moving parts rotate at only one fourth crankshaft speed so that high crankshaft speeds are practical without over stressing other parts of the engine, in the first disclosed embodiment.

Crankshaft crankpin bearing loads are moderate because centrifugal forces exerting an outward force on the parts carried on the crankpins are countered by the inward force on those parts resulting from the inertial resistance to reciprocation of the piston sets. Other bearing loads are lightened because the cyclic gas pressures on the vane pistons always oppose the inertial forces acting on those parts.

Each connecting member incorporates a ring gear whose teeth are engaged with the teeth of a stationary spur gear fixedly mounted to the housing of the device. By this means, accelerating and decelerating movement of the vane pistons around the annular chamber is converted by a combination of planetary and revolving motion of the connecting members into angular rotation of the crankshaft at a uniform velocity in the same angular direction in which the vane pistons are moving. A central crankshaft hub is supported in a rotating central crankshaft hub bearing forming a part of the support member for one of the rotating vane piston sets; this construction stabilizes the moving parts of the device to minimize distortion and friction. The other support members for the remaining rotating vane piston sets are rotatably supported at one end by bearing surfaces in sliding engagement with the first support member and at the other end by an extension of the casing, and axially movable piston chamber dual sidewalls are employed for sealing the pressures within the vane piston chamber.

In operation, with emission control in mind, an extra rich fuel-air mixture supplied via the engine section intake port is supplemented after firing has taken place, but before complete expansion of the power stroke, by additional air supplied from the compressor section and controlled by a spring loaded valve to allow pulses of air to escape into the power stroke section whenever pressure in that section drops below that maintained in the compressed hot air reservoir by a pressure regulator.

Power can either be taken from the crankshaft or in the form of heated compressed air to be used, like steam from a boiler, to drive turbines or expander type motors. In the latter case the compressor section should be supercharged to match its drain on engine power to the capacity of the engine section.

Using the machine as a gas generator offers the possibility of higher overall efficiency resulting from useful recovery of some of the engine heat in the expander motors plus the convenience of power output control equivalent to that enjoyed with a steam engine.

In this connection, the mechanism described here, when modified to serve as an expander motor with contra rotation of the crankshaft relative to the other parts, makes an ideal motor for installation in the hubs of vehicle wheels because of its tremendous torque for a given size, absence of gyroscopic effects, and simple required connections; since only two hose connections to the gas generator are needed, with direction of rotation being dependent upon which hose is used as the high pressure line, and intake port cut-off for efficient operation is automatically adjusted.

BACKGROUND OF THE INVENTION

Rotary vane piston engines employing annular piston chambers for a plurality of sets of accelerating and decelerating vane pistons are described in my U.S. Pat. Nos. 3,241,531; 3,544,242; 3,555,813; 3,556,693; 3,556,694; and 3,658,447; as well as the patents cited and discussed in those U.S. patents.

In the devices of this character disclosed and claimed in my U.S. Pat. No. 3,544,242 the movement of the rotary vane pistons is transformed into angular rotation of the crankshaft by two different types of connecting members, captive connecting members rotatably mounted on crankthrows and "floating" connecting members unsupported except by the pivoting pins in crosshead bearings connecting them to the separate vane piston sets. In the devices of the present invention, only captive connecting members are employed.

My earlier U.S. Pat. No. 2,544,480 shows rotary vane piston devices wherein the annular piston chamber surrounds the connecting member drive mechanism. My earlier U.S. Pat. No. 2,553,954 discloses a more compact form of such devices wherein the annular piston chamber closely encircles an extended portion of the crankshaft with the connecting member drive mechanism being positioned beside the annular vane piston chamber, encircling a nearby crankpin portion of the crankshaft. Two different versions of such devices, with connecting member drive mechanisms laterally displaced from the plane of the annular vane piston chamber, are shown in my U.S. Pat. No. 3,544,242.

My U.S. Pat. No. 3,658,447 shows still another version of this form of rotary vane piston device incorporating axially movable dual sidewalls defining between themselves a pressure chamber connected to receive pressurized gases escaping from the annular piston chamber and serving to force the dual sidewalls apart to provide improved sealing of the piston chamber.

Planetary connecting members incorporating spur gears are shown for example in FIG. 18 of my U.S. Pat. No. 3,544,242 and FIG. 5 of my earlier U.S. Pat. No. 2,544,480. However, it was never recognized before the present invention that planetary connecting members incorporating ring gears positioned to engage stationary spur gears could provide unexpected advantages in reducing dynamic friction and increasing the operating efficiency of these devices.

FIGS. 7 and 8 of my earlier U.S. Pat. No. 2,544,480 show a combined compressor-engine device, in which the lower portion of the annular vane piston chamber is employed as an air compressor, while the upper portion of the same annular piston chamber is employed as an internal combustion engine. FIG. 16 of my U.S. Pat. No. 3,544,242 shows a bypass conduit 242 carrying a portion of the compressed fuel-air charge past the combustion chamber 232 for reintroduction at a partially expanded point in the operating cycle. Those patents did not teach the novel aspect of the present invention by which an adjustable predetermined portion of pure compressed air produced in the separate compressor sector of the device is delivered directly to the expansion portion of the internal combustion engine sector of the same annular piston chamber to reduce undesired emission products and achieve more complete combustion.

OBJECTS OF THE INVENTION

Accordingly, a principal object of the present invention is to produce rotary vane piston devices capable of efficient, low friction operation and employing planetary connecting members, rotatably mounted on crankpins of the central crankshaft, which incorporate ring gears whose teeth engage the teeth of stationary spur gears fixedly secured to the housing of the device, producing crankshaft rotation in the same angular direction as that of the rotary vane pistons.

Another object of the invention is to provide rotary vane piston devices of this character incorporating an axially symmetrical central hub crankshaft portion between oppositely offset crankpins which is rotatably secured in a surrounding hub bearing mounted in a radially extending flange of a support member for one of the vane piston sets, which support member also incorporates concentric bearing surfaces providing the principal radial positioning for the other piston set support members, achieving increased dynamic stability and avoiding distortion of parts resulting in friction and locking. Still another object is to provide rotary vane piston devices of this character with unexpectedly low operating friction, having widely spaced dual bearing surfaces positioning each vane piston support member.

A further object is to provide such rotary vane piston devices incorporating drivepins transmitting to the crankshaft crankpins the angular acceleration and deceleration forces on the vane pistons at localized points closely adjacent to the crankpins, minimizing bending and distortion of moving parts.

Another object is to provide such a rotary vane piston device incorporating a crankpin drive mechanism positioned beside the annular vane piston chamber, with interfitting piston support members capable of free relative angular movement and adapted for highly convenient inertial balancing weight corrections.

A further object of the invention is to provide rotary vane piston devices combining in a single annular vane piston chamber a compressor section in which the vane pistons receive a charge of fresh air and compress this charge for delivery into a compressed air reservoir conduit, and a separate angular sector of the same chamber in which the same vane pistons receive a fuel-air mixture charge and carry this charge through a compression-ignition-expansion-exhaust internal combustion engine cycle, wherein a portion of the compressed air from the compressor sector is delivered to the expansion stage of the internal combustion engine sector to provide unusually efficient combustion, minimizing undesirable exhaust products.

Other and more specific objects will be apparent from the features, elements, combinations and operating procedures disclosed in the following detailed description and shown in the drawings.

THE DRAWINGS

FIGS. 3A and 3B are corresponding schematic diagrams showing the direction of crankshaft rotation in the embodiments of the present invention with spur gears fixed in FIG. 3A, as contrasted with the direction of crankshaft rotation with spur gears rotating in ring gears fixed in prior art rotary vane piston devices in FIG. 3B;

FIG. 4 is an exploded perspective view of the rotating components forming the drive mechanism of the embodiment of FIG. 1, including the components of the crankshaft, the fixed spur gear members and the planetary ring gear-connecting members mounted on the crankpins of the crankshaft;

FIG. 4A is an axial cross sectional elevation view of one of the crankshaft counterweight members illustrated in FIG. 4;

Figure 1:
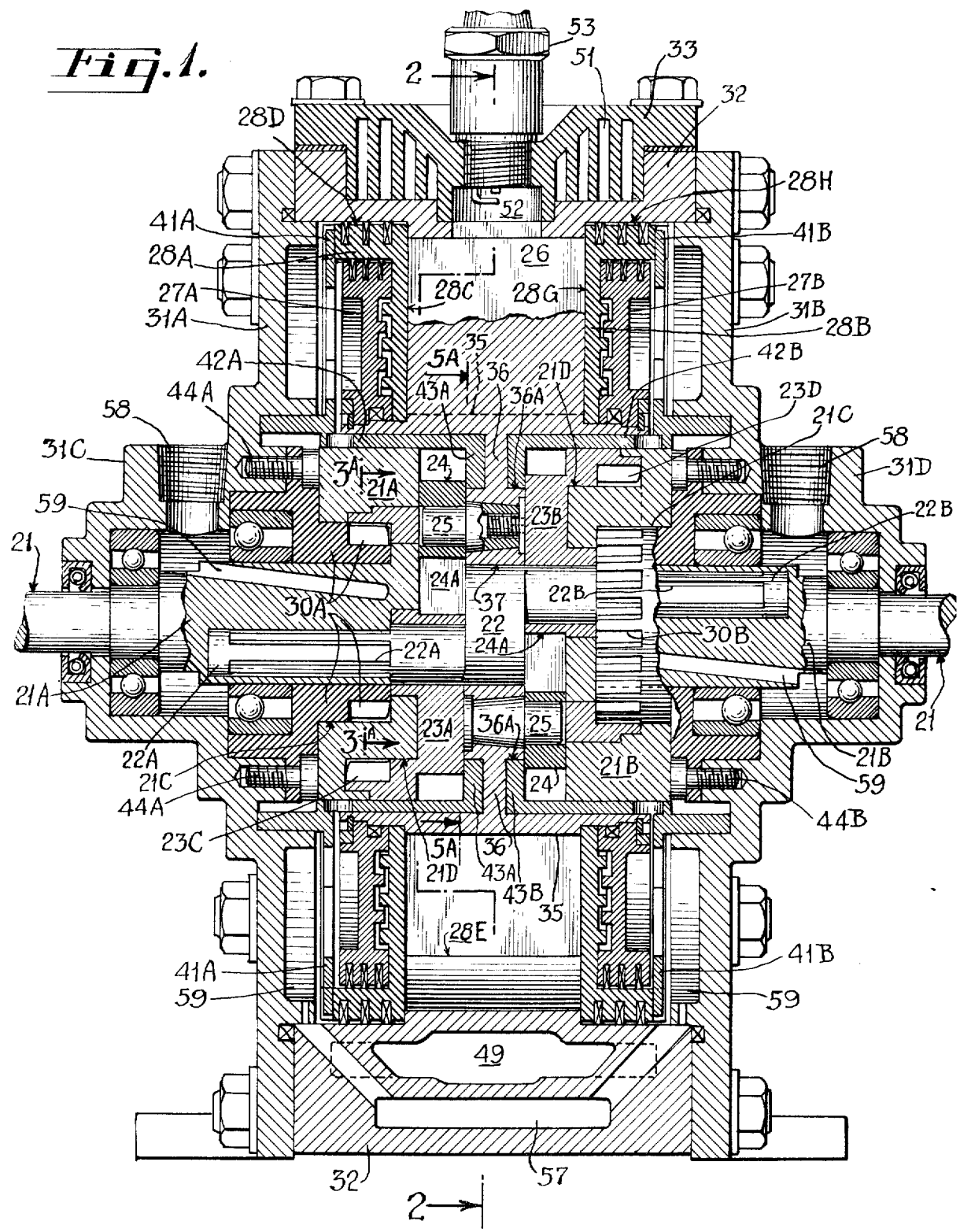
FIG. 1 is an axial cross sectional elevation view of a first preferred embodiment of the present invention incorporating an annular vane piston chamber surrounding a central drive mechanism mounted on the crankpins of the crankshaft.
Figure 7:
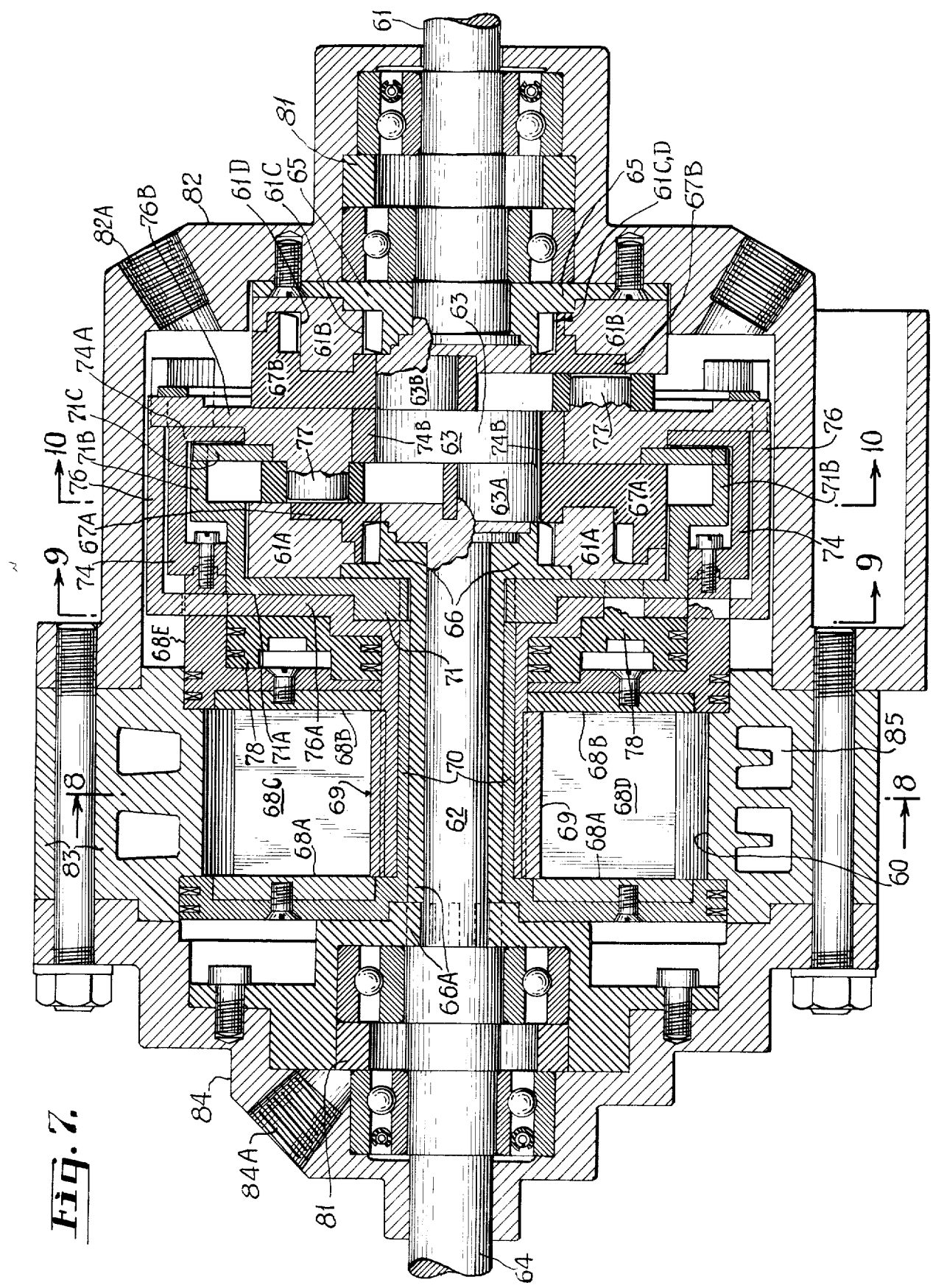
Figure 8:
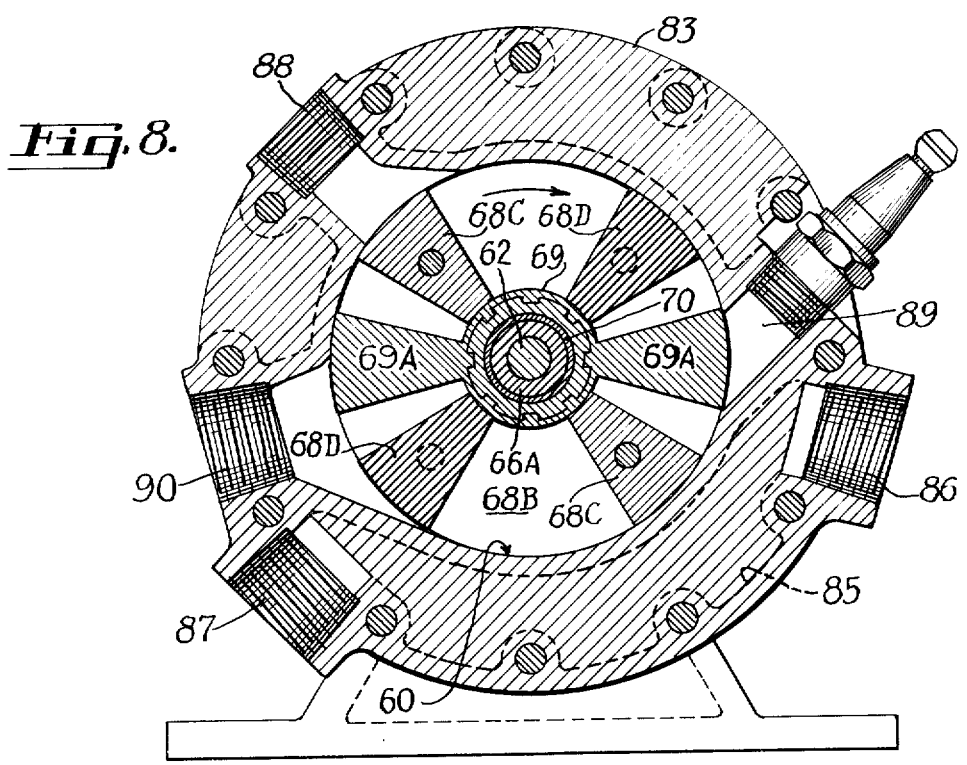
Figure 9:
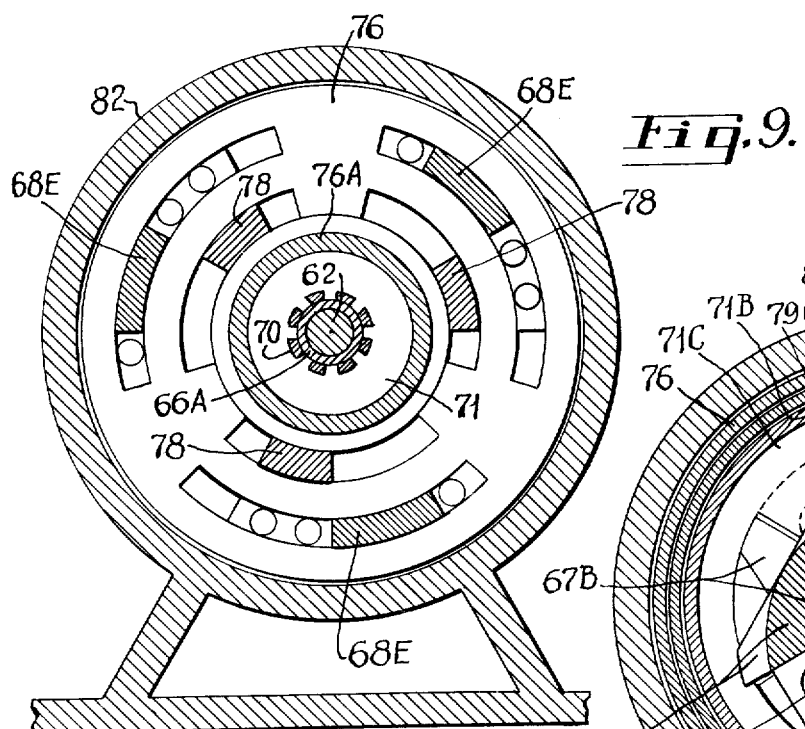
Figure 10:
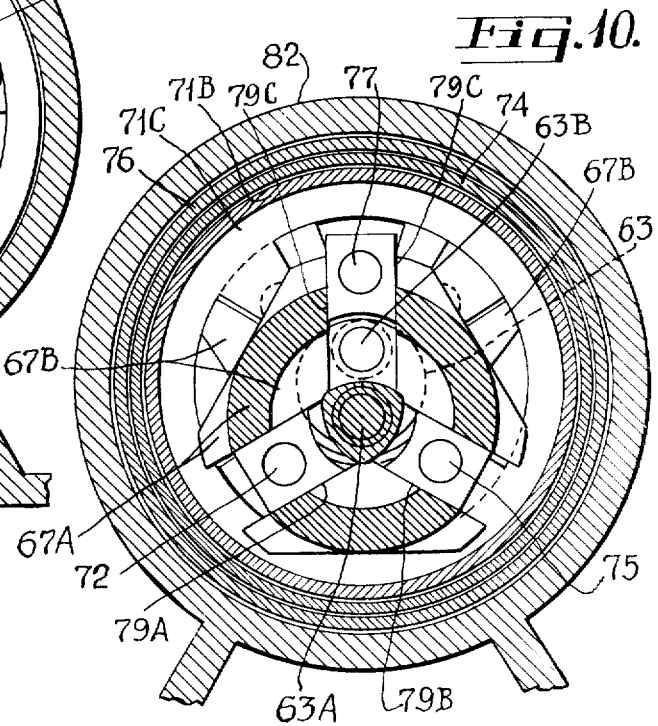

FIG. 5 is an exploded perspective view of one rotary vane piston set and its support forming the inner wall of the vane piston chamber and the central crankshaft hub bearing support, as well as the outer sidewall flange members rotating therewith and forming the outermost component of the pressure sealing dual sidewall assemblies serving to contain pressures within the annular rotary vane piston chamber of the device;

FIG. 5A is a fragmentary transverse cross-sectional view of the inner wall piston support member of FIG. 5, showing its central flange and hub bearing support, taken along the plane 5A—5A shown in FIG. 1;

FIG. 6 is an exploded perspective view of the inner sidewall flanges forming the inner components of the dual sidewall assemblies, each supporting a set of rotary vane pistons, and each having outer flanges transmitting outward axial sidewall pressure to internal shoulders on the casing outer wall;

FIG. 7 is an axial cross sectional elevation view of a second preferred embodiment of the present invention, incorporating an annular rotary vane piston chamber encircling an axial portion of the central crankshaft with its drive mechanism laterally offset beside the annular vane piston chamber encircling the crankpin portion of the crankshaft; and FIGS. 8, 9 and 10 are successive transverse cross sectional elevation views of the device shown in FIG. 7.

GENERAL DESCRIPTION

Figure 2:
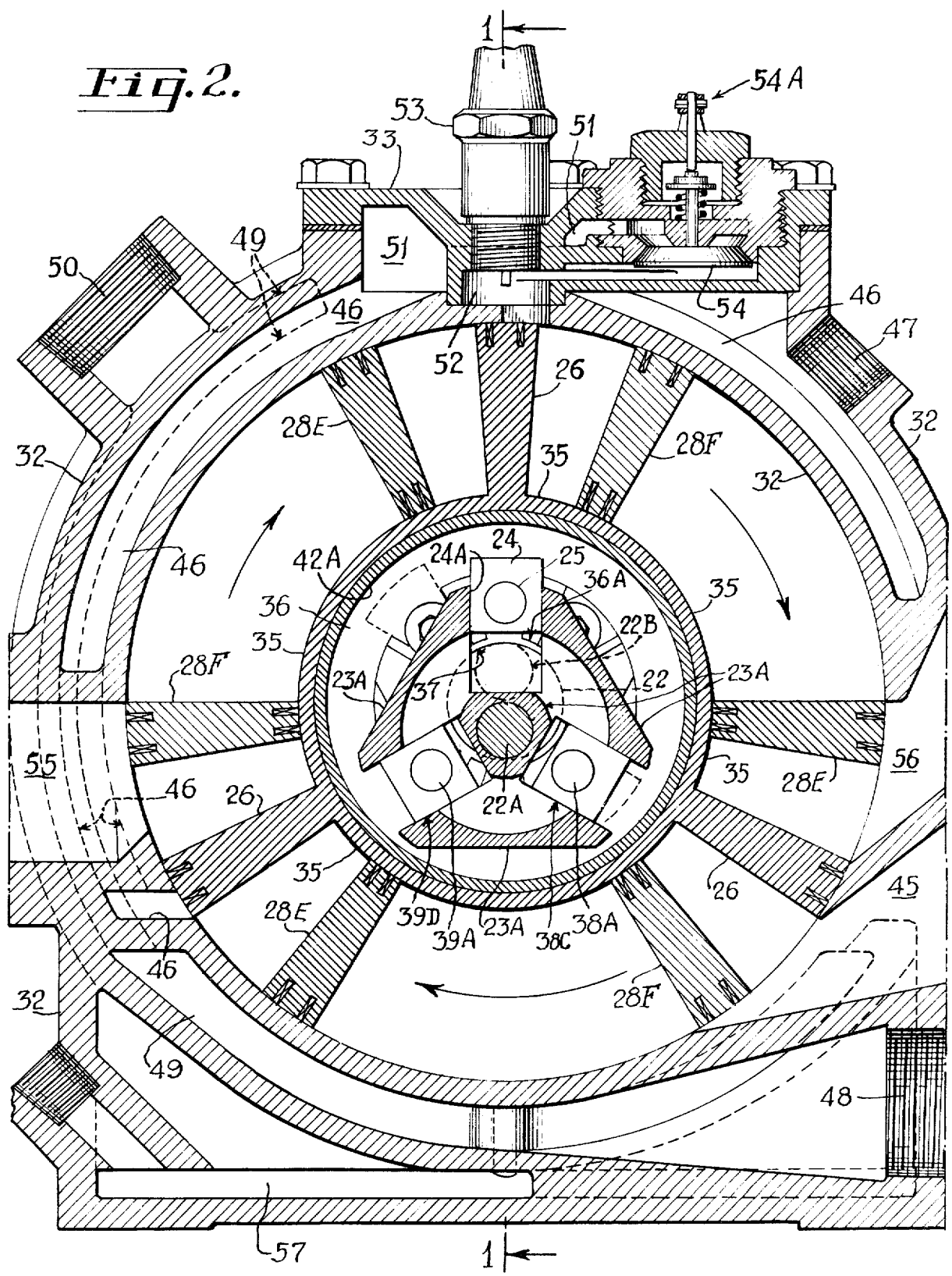
FIG. 2 is a transverse cross sectional elevation view of the embodiment shown in FIG. 1, taken along the plane 2—2 shown in FIG. 1.

The first illustrated embodiment is one in which the vane pistons travel in a ring cylinder surrounding the piston driving mechanism and the attached drawings include FIGS. 1 and 2 showing sectional views of such a design, plus FIGS. 3–6 showing isometric views of the individual moving parts. FIGS. 7–10 show an alternative embodiment in which the ring cylinder is placed beside the driving mechanism. In these latter drawings each piston set has only two vane pistons, to indicate the flexibility of my invention.

Basically this engine, pump or motor consists of a crankshaft having two crankpins 180° apart on which are rotatably mounted connecting members having radially extending slots which position bearing pads pivotally connected with the vane piston sets. Rotation of each of the connecting members is controlled by a combination of a ring gear and a spur gear, there being one set of these for each connecting member, with one gear fixed to each connecting member and the other anchored to the casing.

To give a motion to the vane pistons such that openings into the ring cylinder in which they travel may be timed by the vane pistons to provide adquate porting of the working chambers, ratios of pitch diameters of the gear sets must be chosen so that for each rotation of the connecting members and associated piston sets with respect to the casing, the crankshaft will rotate, relative to the connecting members, as many times as there are vane pistons in each piston set.

Direction of rotation of the crankshaft relative to the other moving parts of the machine is determined by whether the ring or spur gear of each set is anchored to the casing. If the spur gear is anchored as in the preferred embodiments of the present invention, all parts will rotate in the same direction; but when the ring gears are anchored to the casing as in prior constructions, contra rotation of the crankshaft results. These gear sets are shrouded by the crankshaft counterweights and by the connecting members and also serve as low pressure oil pumps to provide oil from the sump for internal cooling and lubrication.

Each vane piston set consists of an equal numer of vane pistons mounted on either the inner wall or one of the side walls of the ring cylinder in which they travel. This construction permits these vane pistons to be connected to their various driving elements without compromising the airtight integrity of the ring cylinder, and avoids distortion of the various parts of the piston assembly resulting from uneven heating since all parts pass successively through the various temperature zones of the machine during each revolution.

Axial forces on the moving side walls exerted by pressure within the ring cylinder are neutralizied by off-setting pressure chambers formed outside the ring cylinder between the sidewalls and flanges assembled as integral parts of the inner wall which entrap gases leaking from within the ring cylinder. Increased leakage will result in higher off-setting pressure so that automatic maintenance of correct pressure for adequate seal between the inner chamber wall, the casing, and the sidewalls is achieved.

In the case of designs with the ring cylinder positioned beside the driving mechanism, only one off-setting pressure chamber is used which is formed between one sidewall and a flange integral with the other sidewall, as shown in FIG. 7.

In the rotary vane piston devices of the present invention there are three groups of moving parts: alternately accelerating and decelerating vane piston sets travelling around an annular vane piston chamber; a rotating crankshaft having oppositely offset crankpins; and planetary connecting members and associated parts mounted on these crankpins and forming a drive mechanism connecting the accelerating and decelerating piston sets to the crankshaft through sliding crosshead bearings and pivot pins.

In prior art rotary vane piston engines, compressors and motors incorporating these same three groups of moving parts, all of such prior art devices employ planetary connecting members with spur gears thereon, engaging stationary ring gears fixed to the outer casings of these prior art devices. In the rotary vane piston devices of the present invention, unexpectedly high efficiency and low friction are achieved by the use of planetary connecting members incorporating ring gears with inward facing teeth engaging outwardly facing teeth of stationary spur gears fixedly anchored to the outer casing. By this means, the crankshaft rotates in the same angular direction as that followed by the vane pistons travelling around the annular vane piston chamber and the gear ratios are chosen to make the angular velocity of the crankshaft a multiple of the piston velocity, A times the average velocity of the vane piston sets, where A is the number of pistons in each of the piston sets.

In the embodiment of the invention shown in FIGS. 1–6, the alternatively accelerating and decelerating vane piston sets are shown in FIGS. 5 and 6, while the uniformly rotating crankshaft is shown in the upper portion of FIG. 4, the stationary spur gears are shown at both ends of the lower portion of FIG. 4, and the planetary connecting members incorporating ring gears which are mounted on the crankpins of the crankshaft are shown in the central lower portion of FIG. 4.

In the embodiment of these FIGS. 1–6, the drive mechanism is centrally positioned in the plane of the annular vane piston chamber and inside its inner diameter, as shown in FIG. 1, forming an axially compact assembly.

In the alternative embodiment of the invention shown in FIGS. 7–10, the drive mechanism is positioned axially offset beside the annular rotary vane piston chamber, forming a radially compact assembly as is clearly evident in FIG. 7.

In both of the illustrative embodiments of the invention, pressure sealing dual sidewall assemblies are incorporated similar to those disclosed and claimed in my U.S. Pat. No. 3,658,447. In addition, the crankshafts of both embodiments of the invention are provided with axially symmetrical central hub portions which are mounted in ring bearings carried by the support member for the vane piston set which is mounted on the inner wall of the piston chamber thereby providing relative positioning and dynamic stability for these moving parts. Furthermore, in the present invention the support members for each of the other piston sets are each provided with ring bearings which are likewise journalled on the portion of the inner chamber wall support member which itself provides the journal bearing for the crankshaft hub portion. By this means, all vane piston sets are provided with support members which are sturdily stabilized and dynamically anchored to the rotating crankshaft, minimizing vibration, bending and dynamic distortions of the various component parts of the device during its operation.

CRANKSHAFT AND COUNTERWEIGHTS

In the embodiment of FIG. 1, the crankshaft 21 is terminated at each end by crankshaft counterweight portions 21A and 21B provided with bearing support stud shafts protruding outwardly through each end of the casing of the device. The counterweight portions are clearly shown in FIG. 4, and the right hand counterweight portion 21B is shown in cross section in FIG. 4A. Splined within radially offset recesses in conterweight portions 21A and 21B are the splined crankpins 22A and 22B of the central crankshaft portion, having an axially symmetrical central hub portion 22 between its crankpins 22A and 22B.

In the cross sectional view of FIG. 4A, it will be noted that each crankshaft counterweight portion is formed with a central hub incorporating the recess splined to receive crankpin portion 22B or 22A, surrounded by an axially-symmetrical ring-shaped recess 21C opening outward toward the adjacent housing endwall of the device and designed to receive a spur gear encircling the hub portion of the crankshaft counterweight member.

For example, at the right hand end of FIG. 4 it will be seen that spur gear 30B is positioned for telescoping installation over the right hand end of the axial stud shaft and bearing support portion of crankshaft counterweight 21B, permitting insertion of the spur gear teeth directly within the ring-shaped cavity 21C in the installed position shown in FIG. 1, with the teeth of spur gear 30B thus being stationary in an axially symmetrical position as shown in the right hand side of FIG. 1. Spur gear 30A at the left hand side of FIG. 1 is shown in section with its teeth extending into the corresponding ring-shaped cavity 21C in the left crankshaft counterweight section 21A, whose ring shaped outward facing cavity 21C is clearly shown at the left side of FIG. 4.

PLANETARY CONNECTING MEMBERS

Mounted on the crankpins 22A and 22B of the central portion of the crankshaft are respective planetary connecting members 23A and 23B shown in FIGS. 1, 2 and 4. A central bore formed in each of these planetary connecting members is rotatably mounted on the crankpin of the crankshaft, while the ring gear portion 23C or 23D respectively extends inside an inwardly facing eccentric ring-shaped cavity 21D formed in the juxtaposed portion of the crankshaft counterweight section 21A or 21B.

As shown in FIGS. 4 and 4A the ring-shaped spur gear cavities 21C are axially symmetrical with the crankshaft axis and the axis of the fixed spur gears 30A and 30B. The ring gear cavities 21D are eccentrically offset from the crankshaft axis, and are concentric with the axis of the individual crankpins. As shown in the left lower portion of unit 21B, seen in FIG. 4 and in FIGS. 4A, these two ring-shaped recesses formed in the opposite faces of the crankshaft counterweight portions 21A and 21B are designed to "overlap" in the crescent shaped region where the ring gear teeth 23D mesh with the spur gear teeth 30B in the region across the central crankshaft axis from the position of the ring gear crankpin, forming the dash line rectangle shown in the lower portions of FIG. 4A.

In FIG. 1, the corresponding engaged teeth rectangle in counterweight 21A is indicated at the left central portion of the drawing, diagonally upward to the left from the central crankshaft hub 22. The crankshaft counterweights 21A and 21B formed in this manner provide dynamic balancing counterweight action, as well as caging seals to allow the intermeshing gear teeth to achieve lubricant pumping action via cooperating lubricant delivery passages.

ROTARY VANE PISTON SETS

The vane piston set 26, having one of its pistons passing the "top dead center" or minimum velocity point in FIG. 2, is fixedly mounted extending radially outward from the ring cylinder inner wall 35, and the inner radial edges of the vane pistons in the other piston sets 28E and 28F ride on inner wall 35, with springn biased sealing strips forming pressure seals, corresponding to piston rings in conventional internal combustion engines.

Extending radially inward from the inside of inner wall 35 is a central radial segmental flange 36 having an axially symmetrical internal bore forming an internal bearing 37 in which the axially symmetrical hub portion 22 of the crankshaft is rotatably engaged. Penetrating the segmental radial flange 36 are two oppositely extending pins 25, diametrically opposed and protruding in opposite directions from the faces of the radial flange 36, all as shown in FIGS. 5 and 5A.

Thus, as shown in FIG. 1, the upper pin 25 extends to the left into a pivot socket in a crosshead bearing pillow block 24 engaged in a radial slideway 24A formed in the left planetary connecting member 23A. In the same manner the lower pin 25 protrudes to the right into a pivot socket in a similar pillow block slidingly engaged in a radial slideway 24A formed in the right planetary connecting member 23B as indicated in FIGS. 1 and 4.

As indicated in FIG. 4, the planetary connecting members 23A and 23B are provided with corresponding raidal slideways accommodating pillow blocks receiving axial pins protruding from the corresponding support members for the other piston sets. Thus, as shown in FIG. 6, the left inner sidewall 28A forms a support member for a second set of vane pistons 28E. Support membe 28A comprises a radial flange 28C forming the left axial inner wall of the piston chamber as shown in FIG. 1, on which the left sealing strip faces of the other piston sets slidingly engage, terminating in a peripheral axial flange 28D extending away from the piston chamber toward the housing endwalls and ending in a series of splined slots engaging corresponding splines in the periphery of an apertured disk 41A having a central drum 42A extending radially inward toward central flange 36 inside the ring cylinder inner wall 35 and terminating in a radially inward extending flange 43A (FIG. 1) incorporating mounting blocks from which extend protruding drive pins 38A and 38B.

The right inner sidewall 28B supporting the remaining piston set 28F forms a mirror image of the assembly 28A–43A, and has a radially extending flange 28G and an axially protruding peripheral rim 28H connected by splined slots to a disk 41B having a central hub 42B extending toward the central flange 36 of inner wall 35 and terminating in a radially inwardly extending flange 43B carrying mounting blocks from which protrude pins 39A and 39B.

As indicated in FIG. 6, pin 39A extends to the left through a cutout sector portion of flange 36 to engage a sliding crosshead pillow block on the facing side of connectngmember 23A which oscillates about crankpin 22A on the left side of central flange 36, inside inner wall 35 and its adjacent central flange 43A on drum 42A. In similar fashion, pin 39B extends to the right inside drum 42B, engaging the right hand connecting member 23B in a similar sliding pillow block engaged in the upper right hand slideway 39D of connecting member 23B shown in FIG. 4. In the same manner, pins 38A and 38B extend to the left and right respectively to engage sliding pillow block bearings 38C and 38D on connecting members 23A and 23B.

In the sectional view of FIG. 2, connecting member 23A is shown in a cross section behind the ring gear teeth 23C along a plane passing through all the pillow blocks and slideways, and showing the location of pins 25, 39A and 38A each connecting each of the piston sets to this connecting member. It will be noted that the flanges 43A, 43B and 36 are all provided with suitable apertures accommodating the pins of the other piston sets, permitting relative acceleration and deceleration of the vane pistons to cause relative angular movement of these piston sets and their respective support members, independently of each other. Thus drums 42A and 42B are free to move angularly with respect to each other and inner wall 35 overlying both these drums.

The rotating engagement of the connecting members upon their respective crankpins 22A and 22B controls this relative angular motion of the support members and their piston sets, producing relative "opening and closing" movement of the pistons as they approach and recede angularly from each other. Thus, as shown in FIG. 2, pistons 26 have decelerated to "dead center" positions while pistons 28E are declerating, approaching pistons 26, and pistons 28F are accelerating, departing from pistons 26.

Each of the piston sets in turn passes through these deceleration, stop and acceleration phases of its cycle, and the piston sets succesively move around the annular piston chamber in this fashion, controlled by the planetary connecting members 23A and 23B on crankpins 22A and 22B, whose rotational movement is governed by the enegagement of their integral ring gears 23C and 23D with the respective stationary spur gears 30A and 30B secured to the casing by bolts 44A and 44B.

Axially movable outer end walls 27A and 27B (FIG. 5) are provided with internal splines axially slidable in and angularly engaging corresponding spline slots in the axial ends of inner end wall 35. Outer end wall 27A is positioned inside the outer peripheral flange 28D of inner sidewalls 28A, between the radial flange 28C thereof and the disk 41A. Outer end wall 27B is correspondingly positioned between radial flange 28G of inner sidewall 28B and disk 41B. The outer peripheries of end walls 27A and 27B are provided with outwardly protruding resilient split sealing rings, similar to piston rings, bearing upon the internal peripheral surfaces of the outer axially extending flanges 28D and H of inner sidewall 28A and 28B respectively, thus producing dual sidewall assemblies forming between themselves pressure sealing chambers. The juxtaposed facing surfaces of outer wall 27A and inner wall 28A are provided with interfitting ring shaped lands and grooves forming a seal, and pressusre escaping from the vane piston chamber is conducted into the space between these two portions of the dual side wall assembly in the same manner as is disclosed in U.S. Pat. No. 3,658,477. Increasing pressure within this chamber urges the slidable outer sidewall 27A axially outward, away from the piston chamber, urging disk 41A against the outer and inner shoulders of the housing ring cylinder endwall 31A (FIG. 1). The corresponding dual sidewall construction at the right hand side of the vane piston chamber is formed by right inner sidewall 28B and right outer sidewall 27B. Outer sidewall 27B is likewise free for axial movement away from inner sidewall 28B as escaping gas "sealing" pressure in the labyrinth therebetween increases, forcing disk 41B against the outer and inner shoulders of the right housing ring cylinder and wall 31B. Outward pressure of the outer sidewalls and disks against the housing end walls created by pressure in the labyrinth chambers is equalized by inward pressure of the inner sidewalls 28A and 28B acting axially inward against the resilient end sealing strips of the vane pistons accelerating and decelerating around the annular ring cylinder between the inner sidewalls 28A and 28B, thus minimizing the escape of gases from the ring cylinder into the chambers of the dual sidewalls.

As shown in FIG. 1, the inner peripheral rim of flange 43B of drum 42B is rotatably and slidingly engaged on an outward facing inner peripheral rim 36A of centrl flange 36 inside the inner ring wall 35. Support member 28A is thus concentrically journalled by inner rim 36A and the outer housing wall 32 encircling its peripheral flange 28D. In similar fashion, the internal rim of flange 43A of drum 42A is rotatably and slidingly engaged on a similar outward facing ring-shaped surface 36A on the other side of central flange 36. In this manner, all three support members 42A, 42B and 35 are slidingly and rotatably engaged and in effect journalled about the journal bearing 37 embracing the central axial hub portion 22 of the crankshaft, in addition to being journalled within housing outer wall 32. This multiply-journalled construction provides an unusually stable positioning of all these parts during their relative angular movement, minimizing distortions, bending moments and friction forces throughout the operating cycle of the device.

While my U.S. Pat. No. 2,544,480 shows a central crankshaft hub 65 between two crankpins 63 and 64, the inner wall 52 of the piston set 51 there disclosed and shown in its FIGS. 1, 2 and 9 incorporates no central stiffening flange or crankshaft main bearing support comparable to the central flange 36 and main bearing 37 of the present invention, which are shown most clearly in FIGS. 5 and 5A, and in a second embodiment in FIG. 7.

AXIALLY SLIDABLE SIDEWALL SEALING

It is evident from FIGS. 5 and 6 that outer sidewalls 27A and 27B are not anchored immovably to the opposite respective inner sidewalls 28B and 28A, as in my U.S. Pat. No. 3,658,447. Instead, these units are all axially slidable relative to each other and to the inner wall 35 of the piston chamber. Pressurized gas escaping from the chamber between the inner rims of inner sidewalls 28A and 28B and the inner "hub" wall 35 is directed into the spaces between the pairs of inner and outer sidewalls, performing the self-balancing sidewall sealing function, facilitated by relative axial sliding movement of these parts enclosing the vane piston chamber to minimize such escaping gas leakage, and excellent sealing action is thus achieved.

HOT COMPRESSED AIR INJECTION

In the embodiment of the invention shown in FIGS. 1–6, a portion of the annular vane piston chamber is utilized as a compressor stage for compression of pure, fresh air which is drawn into the annular chamber via an air-intake passage 45 opening through an intake port to the periphery of the annular chamber, as shown in the lower right hand portion of FIG. 2 where piston 28F is shown accelerating away from piston 26 to provide an intake stage drawing in a fresh charge of air through passage 45. At the same time, accelerating piston 28F is overtaking the next decelerating piston 28E in a clockwise direction, compressing the previously indrawn charge of air. This same decelerating piston 28E is approaching the next piston 26 in the lower left hand portion of the annular chamber shown in FIG. 2 and piston 28E will approach piston 26 until the gap between them is substantially reduced to zero as piston 26 leaves its "dead center" position and begins to accelerate; this permits the charge of air compressed between them to be expelled into compressed air reservoir pasage 46, which extends in a clockwise direction around the remainder of the periphery of housing 32 as shown in FIG. 2, and delivers the hot compressed air to a compressed air outlet 47. Circulating coolant fluid is admitted to the housing 32 through a coolant intake 48 adjacent to the fresh air intake portal 45, and coolant is delivered from intake 48 through a coolant passage 49 extending clockwise around the periphery of housing 32 and shown in solid lines at the bottom portion of FIG. 2 and in dash lines in the upper left portion of FIG. 2, communicating with a coolant exit portal 50 at the upper left in FIG. 2. Coolant passage 49 and the compressed air passage 46 are adjacent to each other side by side over a substantial portion of their lengths, tending to equalize housing temperatures and to avoid "hot spots" and consequent dimensional distortion.

Compressed air passage 46 delivers the hot compressed air to a plenum chamber 51 formed in valve head 33 surmounting housing 32, from which a poppet valve 54 may deliver the hot compressed air to a combustion chamber 52 surrounding the spark gap of an ignition spark plug 53 for a brief period ot time determined by a positive valve timing control mechanism, such as the rocker-arm pushrod assembly 54A shown in FIG. 2. If the poppet valve 54 is merely a spring biassed valve, and no pushrod assembly 54A is employed, as the expansion pressure falls during this expansion stage, it drops below the pressure of hot compressed air in passage 46 permitting the poppet valve 54 to open and deliver a predetermined volume of hot compressed air directly into the combustion chamber 52 and the expansion stage sector of the annular piston chamber.

The remaining portion of the annular vane piston chamber, proceeding clockwise from the compressed air exit port delivering air compressed in the lower sector of the vane piston chamber to the compressed air passage 46, comprises the four-stage cycle engine sector of the device. A conventional but preferably rich fuel-air mixture is delivered through the fuel-air inlet 55 when the vane pistons are at the position shown in FIG. 2. The leftmost piston 28F is accelerating clockwise away from underlying piston 26, producing an intake stage drawing the fuel-air mixture into the vane piston chamber from inlet 55. At the same time, accelerating piston 28F is approaching piston 28E at the upper portion of the annular chamber, compressing between itself and piston 28E the previously indrawn charge of fuel-air mixture. The piston 28E in a similar manner is delivering the final compressive force to the still previous charge betwen itself and the piston 26. This compressed charge is exposed to ignition chamber 52 as piston 26 moves forward from its center position to begin its accelerating forward travel toward the position occupied by piston 28F in FIG. 2. At the close of the expansion stage of the cycle, occurring in the sector extending from the topmost portion of the vane piston chamber to the position occupied by the lower right hand piston 26 in FIG. 2, the spent charge following unusually complete combustion of fuel is expelled through the exhaust port 56. In FIG. 2 the right hand piston 28E decelerating toward the stationary piston 26 will substantially close the gap between them to provide virtually complete scavenging action, expelling all exhaust products from between these pistons before piston 26 leaves the dead center position shown in FIG. 2 to begin its acceleration toward the position of lower right hand piston 28F in FIG. 2 to begin the fresh air intake stage of the compressor sector of the operating cycle of the device.

Since the compressed air is handled by pistons and other parts of the machine which also function in the engine section, energy lost to these parts in the form of heat in the engine section and subsequently transferred from them to the air in the compressor section may be recovered later during expansion of this hot compressed air in other applications. The compressed air may form the complete output of this machine; or a part or all of the compressed air may be returned to the engine section through the poppet valve 54 for more complete combustion and extra efficiency; or the engine output may be taken from the crankshaft in whole or in part.

It is intended that air shall pass only from the hot compressed air reservoir passage 46 into the firing chamber 52 and never the other way, and this may be accomplished by a manually variable needle valve admitting hot compressed air to this lower-pressure section of the expanding working stroke, or by the spring biased poppet valve 54 as shown in FIG. 2, or by a similar valve operated positively by a pushrod and rocker arm arrangement controlled by an engine-driven camshaft in a conventional manner. The combination of the compressor section forming the lower sector of the housing 32 shown in FIG. 2 with the four-stroke cycle engine section formed in the upper portion of the housing 32 provides either a self-powered gas generator or an engine including integral means for adding compressed air to a rich charge previously fired to obtain a clean exhaust. Both nitrous oxide ($NO_x$) and hydrocarbon emissions are thus reduced, since the initial firing of a rich charge avoids the $NO_x$ emissions, and the subsequent injection of hot air gives the ultimate effect of a lean charge in providing excess oxygen for more complete combustion and minimized hydrocarbon emissions. This arrangement in combination with expansion type motors permits high efficiency in power transmission through useful recovery of some of the engine's by-product heat that is usually lost; it gives power output control equivalent to that achieved by a steam engine; and it does not preclude the use of a portion of the hot compressed air for the emission control purposes described above.

The spring-loaded valve 54 may be adjusted to allow pulses of extra air to escape into the power stroke section of the vane piston chamber whenever pressure in that section drops below the pressure maintained in the hot compressed air reservoir passage 46; if more positive control of metered compressed air fed to the power section is desired, the camshaft-pushrod assembly controlled by the crankshaft may be employed.

HOUSING AND COOLANT SYSTEM

The housing ring cylinder endwalls 31A and 31B enclosing the ends of the ring-shaped vane piston chamber are provided with central bearing hub portions 31C and 31D respectively encasing sturdy ball or roller bearings, as shown in FIG. 1. The ring cylinder outer wall 32 encircling the periphery of the device is firmly bolted between the endwalls 31A and 31B, as shown in FIGS. 1 and 2, providing space encircling the annular vane piston chamber for the hot compressed air passage 46, for the housing coolant passage 49 extending from intake portal 48 to exit portal 50, and also for suitable lubricating passages not shown in detail in the drawings. Lubricant from the sump 57 in the lowest portion of the housing ring cylinder outer wall 32 is drawn by the pumping action of the gear teeth through delivery conduits to lubricant ports 58 formed in the upper portions of both housing endwall bearing portions 31C and 31D, and thus leading to the main bearing chambers where crankshaft end portions 21A each revolve. The lubricant is drawn therefrom through diagonal passages 59 in each of these crankshaft end portions, shown in the cross section of FIG. 1, by the pumping action of the intermeshing teeth of the spur gears 30A and 30B and their engaging ring gears 23C and 23D, which serve as oil pumps to expel the indrawn oil to the crosshead pillow block bearings, and to other bearing surfaces of the device. Lubricant draining downward from the moving surfaces passes through endwall chambers 59 inside ring cylinder endwalls 31A and 31B, and thence trans downward to sump 57 for recirculation.

AXIALLY ARRANGED EMBODIMENT OMITTING COMPRESSOR STAGE

The second embodiment of the present invention illustrated in FIGS. 7–10 of the drawing omits the compressor stage occupying the lower sector of the device illustrated in FIG. 2. As shown in FIG. 8, this radially compact embodiment of the invention incorporates three sets of two vane pistons each, alternately accelerating and decelerating around an annular vane piston chamber 60 formed within a cylindrical housing 83, closely encircling an axial section 62 of the crankshaft assembly 61–64. Radially offset crankshaft counterweight portions 61A and 61B are generally similar to the counterweight crankshaft portions 21A and 21B illustrated in FIG. 4.

The driving portion of the crankshaft incorporates an axial hub 63 positioned between two oppositely radially offset crankpins 63A and 63B, respectively anchored in the facing surfaces of crankshaft counterweight portions 61A and 61B concentric with ring gear receiving recesses 61D therein.

The left counterweight portion 61A is anchored via section 62 to the left axial cranshaft section 64, extending beyond the annular ring shaped piston chamber 60 and thence through heavy ball or roller bearings and a suitable seal, projecting beyond the left endwall 84 of the casing to form a protruding drive shaft. The right crankshaft counterweight portion 61B is similarly connected to the right axial crankshaft portion 61, extending through similar bearings and a seal to form a protruding drive shaft at the right side of the device.

A right spur gear 65 is anchored to the right endwall of the housing 82 concentric with the axial portion 61 of the crankshaft, and has its spur gear teeth extending into a concentric ring-shaped, spur gear receiving recess 61C formed in the facing surface of the crankshaft counterweight portion 61B. This annular spur gear recess 61C in the right hand portion of the counterweight 61B coincides below crankshaft section 61 in the position shown in FIG. 7 with the offset ring gear recess 61D formed in the left hand face of this counterweight portion 61B, in the same manner that recesses 21B and 21D overlap to form an intermeshing tooth-engagement region illustrated in FIG. 4A.

In a similar manner, a left stationary spur gear 66 is anchored to the left endwall 84 of the casing via an interfitting splined sleeve 66A encircling the axial portion 62 of the crankshaft inside the annular vane piston chamber. The sleeve 66A is radially stepped to encircle the stationary outer race of the left crankshaft bearing and a spacer sleeve 81, and the sleeve 66A is anchored by bolts to the left housing endwall 84. Spur gear 66 interfits with left crankshaft counterweight portion 61A in substantially the same manner as right spur gear 65 interfits with right crankshaft counterweight portion 61B.

Ring gear connecting members 67A and 67B mounted for rotation respectively on crankpins 63A and 63B are provided with ring gear teeth interfitting with recesses 61D in the crankshaft counterweight portions 61A and 61B, and are movably connected by radially sliding pillow block bearings joined by drive pins to the three separate sets of rotary vane pistons in substantially the same manner as these parts are movably connected in the previously described embodiment of the invention, illustrated in FIG. 4. It is clear from FIG. 7, however, that the drive mechanism of the device, surrounding the crankpins and comprising the connecting members and crankshaft counterweight portions in which they engage the stationary spur gears, is all located axially offset to the right of the plane of the annular vane piston chamber. This allows the annular vane piston chamber 60 to be reduced in diameter, so that the piston chamber portion and the drive portion of the device are roughly comparable in size, shape and radius, producing an unusually compact vane piston engine, as shown in FIG. 7.

Like the drive portion of the device, the vane piston sidewall and inner hub wall support member construction of the embodiment of FIG. 7 is very similar to that shown in FIG. 1. Left piston chamber sidewall 68A and right piston chamber sidewall 68B each support one set of vane pistons 68C and 68D respectively extending therefrom axially into the vane piston chamber. Thus in the cross sectional view of the piston chamber shown in FIG. 8, the upper left and lower right pistons 68C are anchored to the near sidewall which is cut away in FIG. 8, i.e., the left chamber sidewall of FIG. 7, and are accelerating as they begin their sweep across the top and bottom sectors of the vane piston chamber 60 as shown in FIG. 8.

In the cross sectional view of the drive mechanism shown in FIG. 10, lower left drive pin 72 driven by vane piston set 68C connects this accelerating motion to the left ring gear connecting member 67A. At the same time, decelerating vane piston set 68D shown in FIG. 8, supported by the right piston sidewall 68B of FIG. 7, is connected to the right connecting member 67B by drive pin 75 in the lower right hand portion of FIG. 10. The third vane piston set 69A, shown in FIG. 8, is anchored to the inner piston chamber hub wall 69 and is passing through its "dead center" position at the point in the operating cycle illustrated in FIG. 8. At this point, its drive pin 77 at the top of FIG. 10 connects the pistons 69A to the uppermost portion of left connecting member 67A, as shown in FIG. 10.

The interfitting vane piston support members connecting the accelerating and decelerating piston sets respectively to the two connecting members 67A and 67B are shown in detail in FIGS. 7-10. These FIGURES illustrate the manner in which these support members extend axially from the region of the vane piston chamber toward the drive members, and then all incorporate outwardly extending radial flange sections protruding beyond the drive mechanism, connected to outer cylindrical sections encircling the drive mechanism, and terminating in inwardly extending radial drive flange portions all performing dual functions: these inwardly extending radial drive flange portions all provide drive pin connection with crosshead pillow block bearings formed in the two connecting members 67A and 67B; these inwardly extending radial drive flange portions, together with the sliding bearing surfaces of the support members adjacent to the piston chamber 60, also provide wide and effective stable overall bearing support, incorporating two axially separated bearing surfaces, for each of the separate piston sets, minimizing deformation, bending and distortion of the moving parts of the device during operation, while assuring stable and sturdy concentric support for the hub 63 of the drive portion of the crankshaft.

A comparison of FIGS. 7, 8, 9 and 10 will make clearly apparent the interfitting relationship and angular interfitting apertures therein permitting relative angular acceleration and deceleration movement of these support members.

It will be noted that only the right axial end of the vane piston chamber is provided with dual sidewalls for pressure sealing purposes in FIG. 7. Left inner sidewall 68A moves inside a bearing groove in the stator housing 83 embracing the outermost peripheral rim of left sidewall 68A, which has spring biased sealing rings riding upon the inner peripheral surface of the ring shaped housing portion 83 beside the annular vane piston chamber 60.

The left sidewall 68A is formed as a disk shaped portion provided with a central axial sleeve portion 70 surrounding the stationary sleeve portion 66A of the spur gear 66, and terminating in a support member hub portion 71 adjacent to the left crankshaft counterweight 61A and left spur gear 66. Extending radially outward from hub portion 71 is a radial disk shaped flang portion 71A having a stepped cylindrical outer rim portion 71B terminating in an inwardly protruding drive flange 71C.

The right inner sidewall 68B is connected by a stepped flange 68E to an outer cylindrical support member portion 74 having an inwardly extending drive flange 74A, closely adjacent to flange 71C, and having a sleeve bearing 74B encircling the axial crankshaft hub portion 63. Flange 74A thus extends inwardly to form a sturdy hub bearing support 74B for the crankshaft hub portion 63, in the same manner that the crankshaft main bearing 37 of flange 36 provides sturdy, stable crankshaft hub support in the embodiment shown in FIG. 1.

Suitable interfitting sector-shaped apertures permit relative angular movement of these three support members, as indicated in FIG. 9.

Piston chamber inner hub wall 69 supporting the third vane piston set is connected by an axial sleeve portion encircling sleeve 70 to a stepped cylindrical support member 76A extending beyond the cylindrical support members 71B and 74 and terminating in an inwardly extending structure 76B having an outward-facing axially-concentric shoulder receiving and accommodating the flanges 71C and 74A. Drive pin 77 extends from structure 76B for engagement with connecting member 67A, as shown in FIGS. 7 and 10.

Escaping gas leaking from the vane piston chamber between inner hub wall 69 and either sidewall 68A or 68B is directed via duct conduits not shown in the drawings into the dual sidewall sealing space between the right sidewall and a flanged ring disk 78, anchored to the left sidewall support member 68A-70-71, and thus performing the self-balancing sealing function disclosed in my U.S. Pat. No. 3,658,447, by increasing the contact between the sidewalls 68A and 68B and the hub wall 69 until such escaping gas leakage has been reduced to the point where it is no greater than that normally seeping by flanged ring disk 78 and its sealing rings on its inner and outer diameters.

As in the embodiment of FIG. 1, the piston support members are all axially positioned relative to each other by the sidewall separating effect of the vane pistons and the hub 69, interposed between the two sidewalls 68A and 68B.

RING GEAR CONNECTING MEMBERS

Connecting members 67A and 67B, like the connecting members 23A and 23B in the embodiment shown in FIGS. 1-6, both incorporate ring gears respectively engaging the spur gears 66 and 65, as well as radial crosshead pillow block bearings 79A, 79B and 79C shown in FIGS. 7 and 10 and respectively engaging the drive pins 72, 75 and 77 connected to the support members for pistons 68A, 68B and 69 respectively.

As best shown in FIGS. 7 and 8, the housing for the radially compact embodiment of FIGS. 7-10 includes drive section end wall housing 82 encircling the drive mechanism surrounding the crankpins 63A and 63B and including a lubricant entrance portal 82A in its bearing hub through which lubricant is delivered to the moving parts of the drive mechanism. The housing also incorporates ring cylinder outer wall section 83 incorporating coolant passages 85 encircling the ring cylinder 60 as shown in FIG. 7, and left ring cylinder endwall 84 previously mentioned as the anchoring base for the spur gear splined support member 66A, which also incorporates a lubricant portal 84A in its bearing hub.

As shown in FIG. 7, the two end sections of the housing 84 and 82 are secured together by sturdy machine bolts passing through the ring cylinder outer wall 83. The coolant passages 85 encircle the annular vane piston chamber and connect the coolant entrance port 86 shown in FIG. 8 via the encircling passageways 85 of FIG. 7 with the coolant exit port 87 at the left hand side of FIG. 8.

Intake portal 88 introduces the fuel-air mixture into the sector working chambers between the vane pistons, which accelerate and decelerate as they travel in a clockwise direction in FIG. 8, bringing the compressed mixture into juxtaposition with firing chamber 89 where ignition occurs, and the burning charges expand to drive the accelerating pistons successively through the lower portion of their travel around the ring cylinder 60 until they decelerate to expel the exhaust products through the exhaust port 90, all as shown in FIG. 8.

The radially compact embodiment of the invention shown in FIGS. 7–10 thus incorporates the central crankshaft hub support bearing 74B on which flanges 71C and 76B for the other piston support members are also journalled, providing significant dynamic stability, reduced distortion and lowered friction during operation of the device. Also, this embodiment takes advantage of the significantly reduced working loads made possible by the ring gears incorporated in the connecting members 67A and 67B, engaging stationary spur gears 66 and 65, achieving unexpectedly low working loads and consequent reduced friction forces. Both of these advantages of the radially compact embodiment of FIGS. 7–10 are substantially similar to those achieved by the corresponding features in the embodiment of FIGS. 1–6.

With these stationary spur gear embodiments, in which the crankshaft rotates in the same direction as the other moving parts of the device, a higher crankshaft velocity is obtained relative to the work done for a given size and displacement than in conventional devices. Alternatively, a better structural strength balance is achieved between the size of working parts and the loads they can be expected to carry.

In both illustrated embodiments, the hub 22 or 63 provides bearing support via the bearings 37 or 74B for all three piston set support members between the two flanking captive connecting members riding on the crankpins. At the same time, these three support members are journalled in the piston chamber rim wall 32 or 83, and upon each other at the inner corners of the piston chamber, at remote points widely spaced from the crankshaft hub. This dual spaced bearing support for the piston set support members achieves unusual stability and reduced deformation under load.

In both embodiments, the drive pins are positioned in that portion of each support member most closely adjacent to the crankshaft hub bearing. Thus in FIGS. 1 and 2 drive pins 25, 39A and 38B are closely adjacent to hub bearing 37 in flange 36; in FIGS. 7 and 10, the drive pins 72, 75 and 77 are closely adjacent to the hub bearing 74B. This proximity further minimizes bending deformation of the support members.

COOPERATING ADVANTAGES OF OFFSET SUPPORT MEMBERS

The compact, axially offset embodiment of FIGS. 7–10 is believed to comprise a significant and basic structural concept, and not mere constructional details, for several reasons. In conjunction with its widely-spaced stable dual-bearing support for all three support members, and localizations of dynamic drive pin loads in the immediate vicinity of the crankpins, this embodiment of the invention provides convenient space and access for dynamic balancing of the connecting members. All of these features minimize bending and distortion of moving parts, and result in reduced wear and extended useful life for these devices.

The ease of access for dynamic balancing is best shown in FIG. 7, where right sidewall 68B for piston set 68D is nearest to the drive mechanism surrounding crankpins 63A and 63B. The remote left sidewall furthest from the drive mechanism has the combined flywheel mass of its piston supporting portion 68A and its inner sleeve portion 70. Therefore its cylindrical portion 71B and its inwardly-extending drive flange 71C may nest inside corresponding parts 74 and 74A of the closer right sidewall assembly. The support member requiring most dynamic balancing weight and space is the inner hub wall 69 with minimum average radium; its cylindrical portion 76A, extending radially outside and beyond parts 71B and 74, is thus exposed for adding or removing weight on its outer rim, avoiding any interference with the other parts moving angularly inside it, as shown in FIGS. 7 and 10.

The interfitting, segmentally cutaway apertured flanges of these support members, shown between sidewall 68B and crankshaft counterweight portion 61A in FIG. 7, are clearly shown in FIG. 9, permitting free relative angular movement of the three support members.

Also in this way the driving segments positioning and driving flanged ring disk 78 pass through similar apertures provided in pieced flange section 76.

Only in this way can adequate bearing support with widely spaced separation of dual bearing surfaces be provided for the three individual vane piston sets, while also affording sufficient available space in compact form for the most complete inertial balancing of the individual piston sets. This is true because this arrangement provides the small, lightweight innermost piston support sleeve 69 with a support member 76A outside the other support members, where weight can conveniently be added. With this construction, those parts of the driving flanges of the individual piston set support members which must have increased thickness for the purposes of inertial balance of the piston sets relative to each other are positioned for easiest modification for this purpose, and for minimum relative correction.

It will thus be seen that the objects set forth above, among those made apparent from the preceeding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An improved alternately accelerating rotary piston device of the type having a stator housing forming an annular chamber, a plurality of sets of angularly spaced vane pistons successively arrayed in the chamber, a rotatable support member for each piston set, each set of pistons having at least two vanes secured to one of said rotatable support members, a crankshaft rotatably mounted on a crankshaft axis in the stator housing and having two crankpins oppositely offset, and two connecting members each rotatably mounted on one of said crankpins, and each interconnecting all of the piston support members in torque-transmitting relationship to said one of the crankpins of the crankshaft, wherein the improvement comprises:
- A. spur gear means fixedly secured to the stator housing having outwardly facing teeth concentric about the crankshaft axis, and
- B. ring gear means integral with each connecting member and having inwardly facing teeth concentric with its supporting crankpin and engaging the spur gear teeth, whereby the vane piston sets, the crankshaft and the connecting members all rotate in the same angular direction.

2. The rotary piston device defined in claim 1, wherein each connecting member is connected to each rotatable piston support member by a pivot pin anchored in and protruding from the support member and pivotally engaging a slidable bearing block mounted in a radial slideway formed in the connecting member.

3. The rotary piston device defined in claim 2, wherein each piston support member is provided with two diametrically opposed pivot pins each respectively engaging one of the connecting members.

4. The device defined in claim 3 wherein said pivot pins protruding from each support member are positioned closely adjacent to said crankpins, localizing bending stresses and reducing dynamic distortions in said support members during operation of the device.

5. An improved alternately accelerating rotary piston device of the type having a stator housing forming an annular chamber, a plurality of rotatable support members, a corresponding plurality of sets of at least two angularly spaced vane pistons successively arrayed in said chamber and each secured to one of said support members, a crankshaft rotatably mounted on a crankshaft axis in said stator housing and having two crankpins oppositely offset, two connecting members each rotatably mounted respectively on one of said crankpins and each interconnecting in torque-transmitting relationship said stator housing with all of said support members and said crankpin, wherein the improvement comprises:
- A. a central crankshaft hub portion formed between the oppositely offset crankpins at the intersection of said crankshaft axis with a central transverse plane of said annular chamber, and
- B. a crankshaft hub bearing rotatably engaging said hub portion and formed in a radially inwardly extending central flange of a first one of the support members substantially coinciding with said central transverse plane.

6. The rotary piston device defined in claim 5 wherein the crankshaft hub bearing is formed as a sleeve encircling the crankshaft hub about its entire periphery on said central transverse plane.

7. The device defined in claim 5 wherein the annular chamber surrounds the offset crankpin portion of the crankshaft, and wherein said first support member incorporating the crankshaft hub bearing forms the inner hub wall portion of the annular chamber.

8. The device defined in claim 5, further including an outwardly facing bearing surface formed in said first support member flange concentric with the hub bearing, positioning and supporting a plurality of inwardly facing bearing flange portions formed on each of the other piston support members, further increasing dynamic stability of all of the piston support members.

9. The device defined in claim 8 wherein two of said piston support members are provided with outwardly-facing peripheral bearing surfaces each slidingly engageable with an outer wall portion of the stator housing, cooperating with the outwardly facing bearing surface of the first support member to provide radial positioning and rotatable support for said piston support members.

* * * * *